US006412259B1

(12) United States Patent
Wiegert

(10) Patent No.: US 6,412,259 B1
(45) Date of Patent: Jul. 2, 2002

(54) GATHERING ROLLER MECHANISM FOR HARVESTING DEVICE AND HARVESTING DEVICE UTILIZING SAME

(75) Inventor: Ludger Wiegert, Ostbevern (DE)

(73) Assignee: Claas Saulgau GmbH, Saulgau (DE)

( * ) Notice: Subject to any disclaimer, the term of this patent is extended or adjusted under 35 U.S.C. 154(b) by 0 days.

(21) Appl. No.: 09/462,664

(22) PCT Filed: Jul. 14, 1998

(86) PCT No.: PCT/EP98/04371

§ 371 (c)(1),
(2), (4) Date: Jan. 11, 2000

(87) PCT Pub. No.: WO99/03323

PCT Pub. Date: Jan. 28, 1999

(30) Foreign Application Priority Data

Jul. 18, 1997 (DE) .......................... 197 30 912

(51) Int. Cl.$^7$ .............................................. A01D 45/02
(52) U.S. Cl. ................... 56/60; 56/94; 56/1.4
(58) Field of Search .................. 56/114, 500, 119, 56/94, 66, 59, 75, 78, 82, 88, 93, 38, 111, 118, 104–105, 106, 69, 108

(56) References Cited

U.S. PATENT DOCUMENTS

| | | | |
|---|---|---|---|
| 1,351,665 A | | 8/1920 | Logarzo |
| 2,527,190 A | * | 10/1950 | Kuhlman ..................... 460/28 |
| 2,870,593 A | | 1/1959 | Anderson |
| 3,462,928 A | * | 8/1969 | Schreiner et al. ............. 56/104 |
| 3,832,836 A | * | 9/1974 | Anderson ..................... 56/104 |
| 3,858,384 A | * | 1/1975 | Maiste et al. ................ 56/14.2 |
| 4,233,804 A | * | 11/1980 | Fischer et al. ................ 56/104 |
| 4,581,878 A | * | 4/1986 | Vida et al. .................... 56/114 |
| 4,845,930 A | * | 7/1989 | Dow ........................... 56/113 |
| 5,009,061 A | * | 4/1991 | Heuling ....................... 56/104 |

FOREIGN PATENT DOCUMENTS

| | | | | |
|---|---|---|---|---|
| DE | 1041722 | * | 10/1958 | .................. 56/119 |
| DE | 6809134 | * | 11/1968 | .................. 56/119 |
| DE | 1757213 | | 2/1970 | |
| DE | 2000140 | | 7/1971 | |
| DE | 2736630 | * | 2/1978 | .................. 56/119 |
| DE | 3231953 | * | 3/1984 | .................. 56/119 |
| DE | 3918362 | | 12/1990 | |
| DK | 40901 | * | 10/1929 | .................. 56/119 |
| FR | 72618 | * | 7/1957 | .................. 56/119 |
| FR | 1268615 | | 6/1961 | |
| FR | 2522925 | * | 3/1982 | .................. 56/119 |
| SU | 127503 | * | 3/1959 | .................. 56/119 |

* cited by examiner

Primary Examiner—Robert E. Pezzuto
Assistant Examiner—Árpád Fábián Kovács
(74) Attorney, Agent, or Firm—Jordan and Hamburg LLP

(57) ABSTRACT

The device for harvesting corn or similar cereals, which can be constructed particularly as an attachment for combine harvesters or field choppers, having two gathering rollers, which are disposed on either side of a gathering gap for separating the fruit from the plant part bearing it, are driven to rotate about axes of rotation pointing in the direction of travel of the device and are provided with several longitudinally extending cross members, ribs or similar projections, forming working edges protruding over the basic bodies of their rollers. The working edges of the gathering rollers, disposed distributed over the perimeter of the basic bodies of the rollers, traverse working surfaces tapering conically towards the front end of the gathering rollers and with one another or with the basic body of the respectively adjacent gathering roller, form the boundary of the passage gap. The axes of rotation of the gathering rollers converge towards the front ends of the gathering rollers.

20 Claims, 5 Drawing Sheets

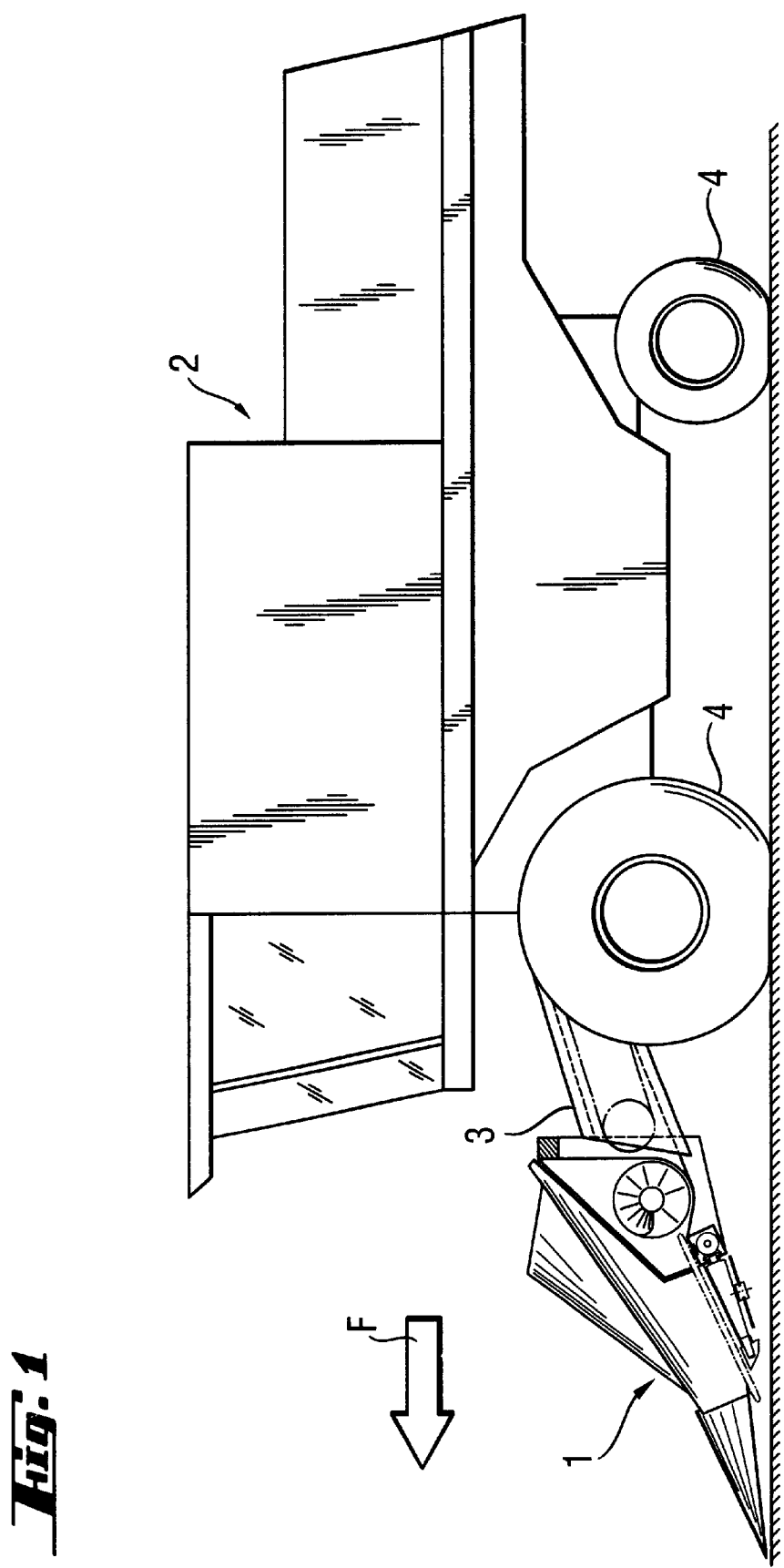

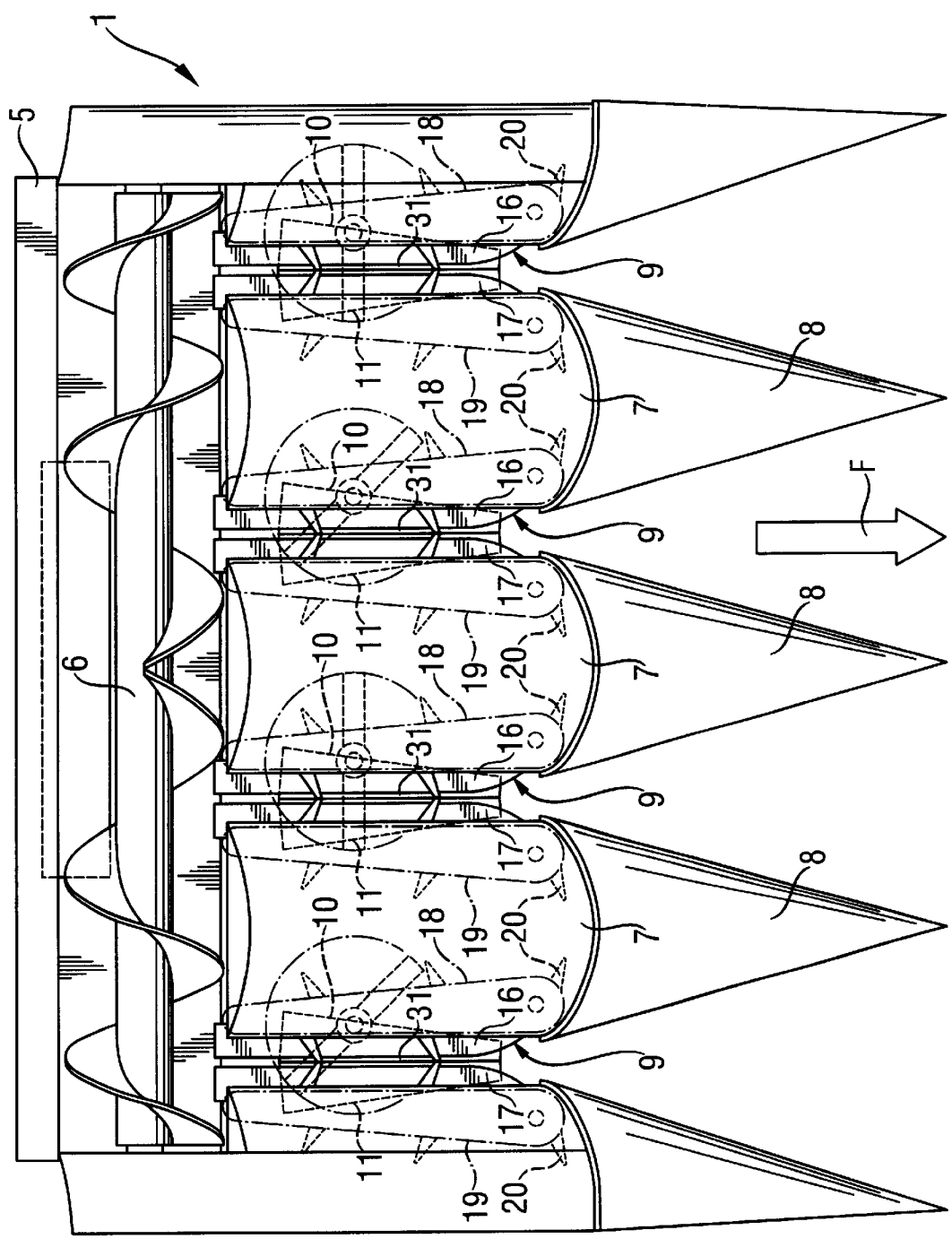

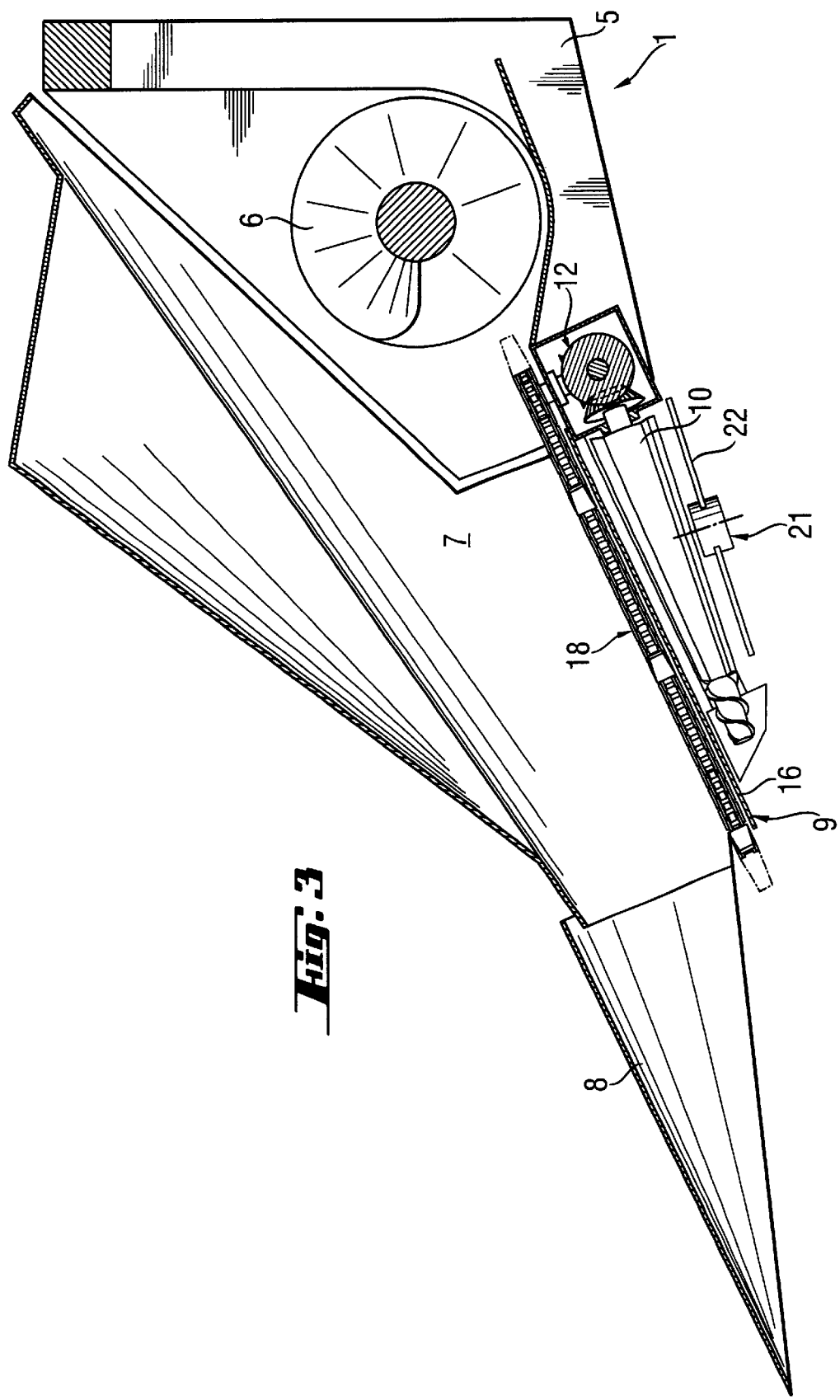

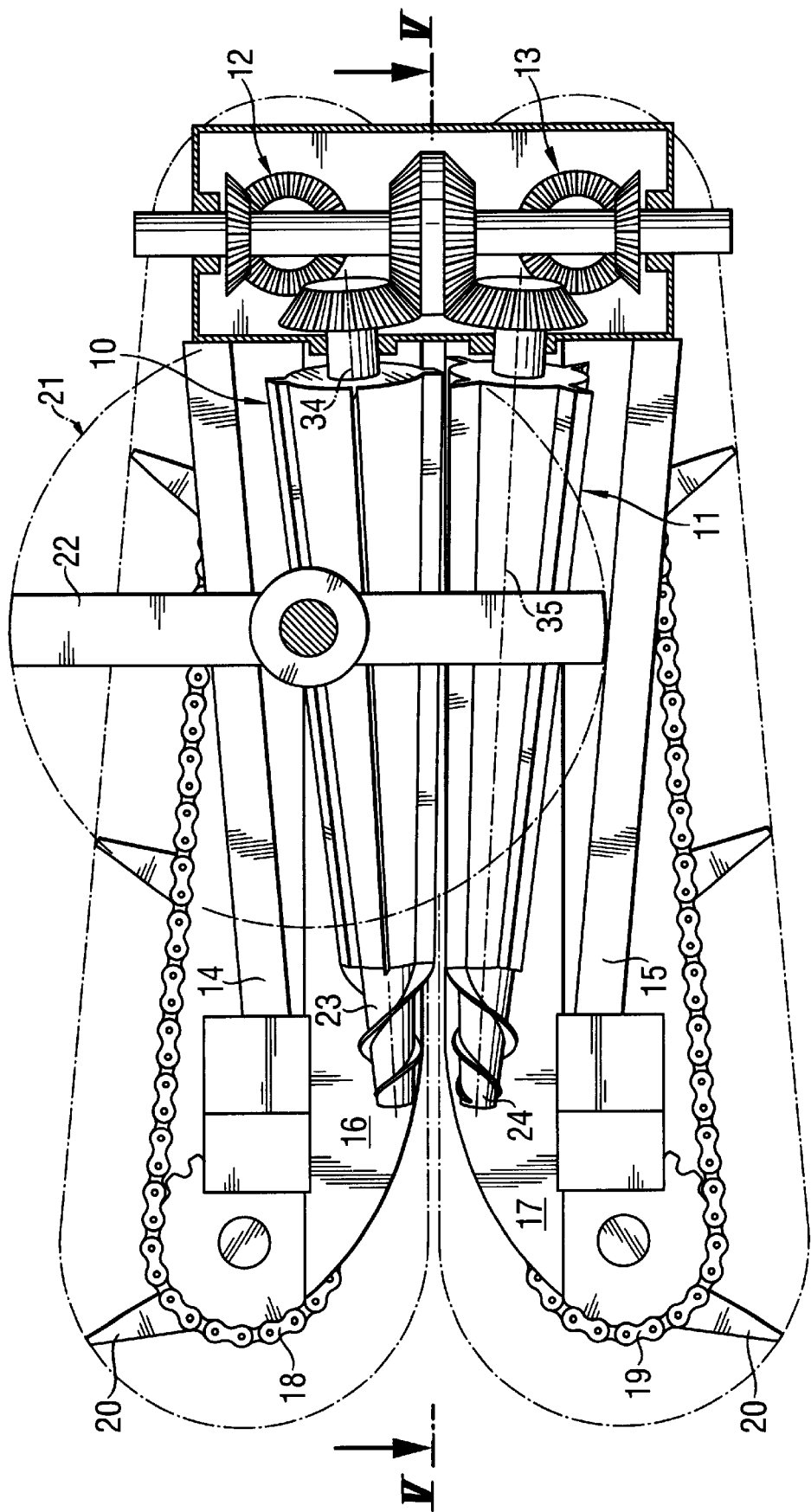

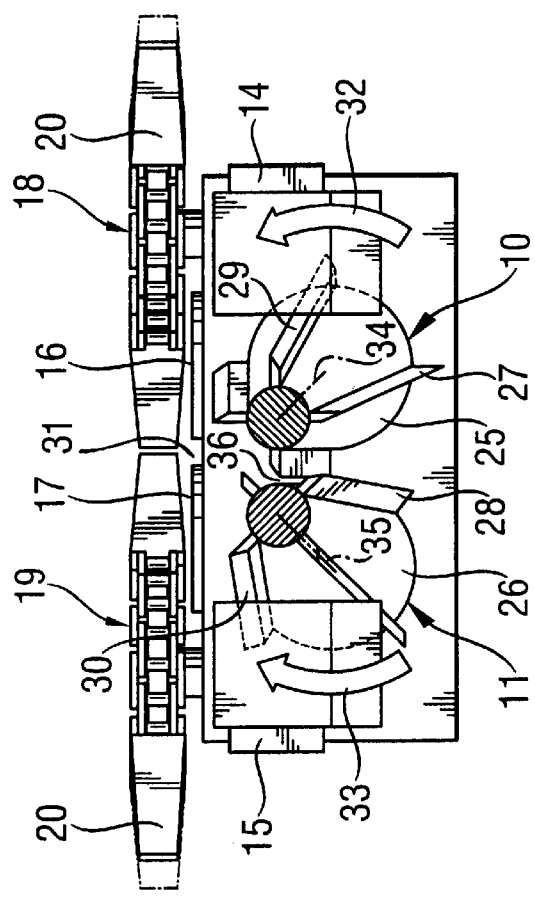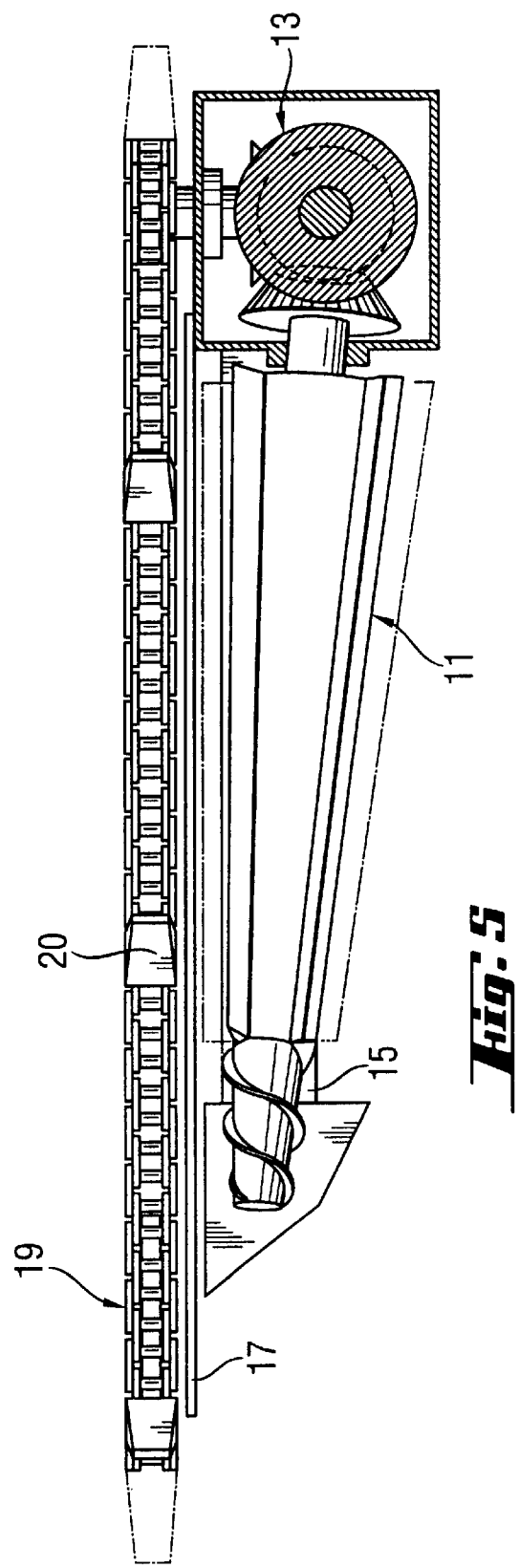

GATHERING ROLLER MECHANISM FOR HARVESTING DEVICE AND HARVESTING DEVICE UTILIZING SAME

BACKGROUND OF THE INVENTION

The invention relates to a device for harvesting corn or similar cereals, especially to an attachment for combine harvesters or field choppers.

In the case of a known device of this type (DE-B-17 57 213; U.S. Pat. No. 2,870,593), the axes of rotation of the gathering rollers are aligned parallel to one another. The conicity of the working surfaces of the gathering rollers accordingly creates a passage gap, which decreases in width towards the rear base end of the gathering roller.

For a different, known device (DE-A-20 00 140, FR-A-1 268 615), the gathering rollers have cylindrical working surfaces. The axes of rotation of the gathering rollers diverge towards the front end of the gathering rollers, so that a passage gap, which decreases in width towards its rear end, is likewise formed by these means.

In the case of a furthermore known device (DE-C-39 18 362), the gathering rollers have cylindrical working surfaces and axes of rotation, which are mutually aligned in parallel and accordingly a passage gap, the width of which remains the same over its length. For comminuting the harvested stalks, a cutting device with, for example, a rotating cutting knife may be provided below the gathering rollers.

SUMMARY OF THE INVENTION

The invention is concerned with the problem of creating a harvesting device of the type mentioned above, which, while reducing the wear at the gathering rollers, realizes a gathering process, which treats the harvested material with particular care in the front region of the passage gap.

Because the axes of rotation of the gathering rollers are aligned so as to converge towards the front ends of the gathering rollers, the conicity of the gathering rollers can be selected freely from the point of view of specifying a desired speed of pulling the harvested material through the passage gap .and of increasing this speed towards the discharging end. while the desired configuration of the passage gap is retained. Accordingly, a relatively small diameter with a correspondingly low circumferential speed during the rotation while. working can be specified for the gathering rollers at the front inlet end of the passage gap, so that the action on the stalks of the harvested goods at the start of the drawing-through procedure sets in gently and the occurrence of slippage with the consequence of wear at the front ends of the gathering rollers is decreased. In coordination with the convergence angle of the axes of rotation, a conical angle can be specified for the gathering rollers and result in a relatively large increase in the diameter of the working circle of the gathering rollers, which is associated with a large increase in the circumferential speed of the working surface of the gathering rollers towards the discharging end of the passage gap. This increase in speed, which preferably is about 50%, permits an increase in the harvesting speed with gentle gathering or a shorter construction of the gathering rollers with retention of the harvesting speed.

Further details and effects arise out of the following description and the drawing, in which an example of the object of the invention is shown diagrammatically in greater detail.

IN THE DRAWINGS

FIG. 1 shows a side view of a combine harvester with an inventive harvesting device as an attachment, FIG. 2 shows a plan view of the harvesting device of FIG. 1, FIG. 3 shows a side view of the harvesting device on an enlarged scale, FIG. 4 shows a gathering unit of the harvesting device of FIG. 2, seen from below, FIG. 5 shows a side view of the unit of FIG. 4, and FIG. 6 shows a front view of the unit of FIG. 4.

DESCRIPTION OF THE PREFERRED EMBODIMENTS

FIG. 1 illustrates a device 1 for harvesting corn or similar cereals, which forms an attachment for a combine harvester 2. However, it can also be combined with a field chopper or used as an independent structural unit, such as an add-on unit. In the case of the example shown, the harvesting device is disposed ahead of a conveyor 3, which supplies the harvested goods, for example, the corn cobs, to the processing part of the combine harvester 2, which is supported by wheels 4 on the ground.

In detail, the harvesting device 1 comprises a machine frame 5, a transverse screw conveyor 6, covers 7, divider points 8 and a number of gathering units 9, of which, for example, four (9) are illustrated in FIG. 2.

As can be seen particularly in FIGS. 4 to 6, each gathering unit 9 comprises two gathering rollers 10, 11, which in each case are driven by a transmission 12, 13. Gathering plates 16, 17, which are supported by longitudinal beams (14, 15), are provided above the gathering rollers 10, 11 above the drawing in chains 18, 19 rotate in opposite directions driven inwards, which are studded with catches 20.

Below the gathering rollers 10, 11 of a gathering unit 9, a chopper 21 may be provided, which chops the stalks of the harvested goods as the latter pass through the gathering rollers 10, 11. The chopper shown has rotating blades 22; however, it may also have any different construction.

At their front ends, the gathering rollers 10, 11 are equipped with drawing in screws 23, 24 and have a conical, basic body 25, 26, which is studded with longitudinally extending cross members 29, 30 defining working edges 27, 28. The, gathering rollers 10, 11, disposed on either side of a gathering gap 31 formed by the gathering plates 16, 17, run in the operating state in the direction of the arrows 32, 33 (FIG. 6) about the axes of rotation 34, 35, which point in the driving direction F and are aligned so as to converge towards the front ends of the gathering rollers 10, 11. As a result of this converging alignment of the axes of rotation 34, 35, a conicity can be specified for the gathering rollers 10, 11 which, taking into consideration only the desired increase in the circumferential speed of the conical working surfaces, which are traversed by the working edges 27, 28 of the gathering rollers 10, 11, can be selected towards the outlet end of the passage gap 36, which is formed between the gathering rollers 10, 11.

In the case of the example shown (FIG. 6), the working edges 27 of the one gathering roller 10 are offset with respect to the working edges 28 of the other gathering roller 11 to form a gap and the working edges 27, 28 define the passage gap 36 in each case by traversing the angular position with the least distance from the basic body 25, 26 of the surface of the adjacent gathering roller. The width of the passage gap 36, so defined, between the gathering rollers 10, 11, can amount to about 6 to 15 mm and preferably about 8 to 12 mm at the front ends of the latter and to about 2 to 10 mm and preferably about 3 to 6 mm at the base ends.

In a modified version, the working edges 27, 28 of the two gathering rollers 10, 11, on passing through the angular position with in each case the least distance from the working surface of the adjacent gathering roller, can in each case lie aligned opposite the working edges of the of the adjacent gathering roller and, at the same time, form the boundary of the passage gap 36. With this development, the passage gap 36 between the gathering rollers 10, 11 can have an essentially constant width of about 1 to 10 mm and preferably of about 3 to. 5 mm.

The basic bodies 25, 26 of the gathering rollers 10, 11 have a conical shell, and the cross members 29, 30 presenting the working edges 27, 28 have a constant height over their length, so that the working surfaces of the gathering rollers 10, 11, defined by the working edges 27, 28, surround the shells of the basic bodies 25, 26 conically at a distance. At the same time., the diameter of the working surface at the front end of the gathering rollers 10, 11 is about 75 to 125 mm and preferably 90 to 100 mm. The length of the gathering rollers generally is between 400 and 600 mm.

What is claimed is:

1. A harvesting device for harvesting a crop by separating a usable crop from vegetative material and having a front end, a rear end and a generally longitudinal axis extending between said front and rear ends, said harvesting device comprising:

a frame structure;

a first gathering roller mounted on said frame structure for rotation about a first roller axis in a first direction of rotation, said first gathering roller having a first basic body and first projections extending from said first basic body, said first projections having first working edges;

a second gathering roller mounted on said frame structure for rotation about a second roller axis in a second direction of rotation which is opposite to said first direction of rotation, said second gathering roller having a second basic body and second projections extending from said second basic body, said second projections having second working edges, said first and second gathering rollers being disposed juxtaposed to and spaced apart from one another to define a passage gap therebetween, said first and second basic bodies of the respective first and second rollers being formed with respective first and second conical surfaces which taper as said front end of the harvesting device is approached, said first and second roller axes converging toward one another as said front end of the harvesting device is approached, whereby the crop entering the passage gap is exposed to a circumferential speed of each of said first and second gathering rollers which is relatively low at front ends of said first and second gathering rollers as compared to a relatively large circumferential speed at a discharging end of each of said first and second gathering rollers thereby reducing wear at the front ends of the first and second gathering rollers; and gathering plates laterally disposed on said frame above said first and second gathering rollers, said gathering plates having portions defining a gathering gap therebetween, rotation of said first and second in opposed directions drawing said vegetative material downward through said passage and gathering gaps, said usable crop being detached from said vegetative material and deposited on said gathering plates when said vegetative material is drawn through said gathering gap.

2. A harvesting device according to claim 1 wherein said first and second projections are elongated projections having first and second elongated working edges respectively, said first elongated working edges converging toward said first roller axis as said front end of the harvesting device is approached, said second elongated working edges converging toward said second roller axis as said front end of the harvesting device is approached.

3. A harvesting device according to claim 1 wherein said first conical surface has a first central conical axis which coincides with said first roller axis said second conical surface has a second central conical axis which coincides with said second roller axis.

4. A harvesting device according to claim 1 wherein said first working edges traverse a first conical surface having a first central conical axis which coincides with said first roller axis, said second working edges traversing a second conical surface having a second central axis which coincides with said second roller axis.

5. A harvesting device according to claim 1 wherein said first projections are angular off set from said second projections such that said first and second projections pass alternately through said passage gap.

6. A harvesting device according to claim 5 wherein said first and second rollers each have front and rear ends with said front ends being smaller than said rear ends, the minimum distance between a first working edge of said first roller and said basic body of said second roller as said first working edge traverses said passage gap is about 6 to about 15 mm at said front ends of said rollers and about 2 to 10 mm at said rear ends of said rollers.

7. A harvesting device according to claim 5 wherein said first and second rollers each have front and rear ends with said front ends being smaller than said rear ends, the minimum distance between a first working edge of said first roller and said basic body of said second roller as said first working edge traverses said passage gap is about 8 to about 12 mm at said front ends of said rollers and about 3 to about 6 mm at said read ends of said rollers.

8. A harvesting device according to claim 5 wherein the width between a first working edge of said first roller and said basic body of said second roller as said first working edge traverses said passage gap is a substantially constant width of about 1 mm to about 10 mm.

9. A harvesting device according to claim 5 wherein the width between a first working edge of said first roller and said basic body of said second roller as said first working edge traverses said passage gap is a substantially constant width of about 2 mm to about 5 mm.

10. A harvesting device according to claim 1 wherein each of said first and second basic bodies have a front end having a diameter of about 75 to about 125 mm.

11. A harvesting device according claim 1 wherein each of said first and second basic bodies have a front end having a diameter of about 90 to about 100 mm.

12. A harvesting device according to claim 1 further comprising a chopping device for chopping said crop, said chopping device being mounted on said frame structure and underlying said first and second gathering rollers.

13. A harvesting device according to claim 1 where each of said first and second basic bodies have front and rear ends and the respective conical surfaces have front and rear ends, the conicity of said first and second conical surfaces and the angle of convergence of the rotational axes of said first and second gathering rollers being selected such that the circumferential speed of the rear ends of said first and second conical surfaces is about 25% to about 50% greater than the circumferential speed of the front ends of said first and second conical surfaces.

14. A harvesting device according to claim 1 wherein each of said first and second gathering rollers have a front end, and a drawing in helical device on the front end of said first and second gathering rollers for drawing is said crop.

15. A harvesting device according to claim 1 further comprising a drawing-in device having crop-engaging parts, said drawing-in device being mounted on said frame and overlying said gathering rollers so as to move said engaging parts in a direction toward the rear end of said harvesting device, said gathering plates being disposed between said gathering rollers and said drawing-in device.

16. A harvesting device according to claim 15 wherein said drawing-in device comprises an endless chain, said crop-engaging parts extending laterally from said endless chain.

17. A gathering unit for use in a harvesting device for harvesting a crop by separating a usable crop from vegetative material bearing said usable crop, said gathering roller mechanism comprising:

a gathering conveyer operable to convey the usable crop for collection following a separation of the usable crop from the vegetative material;

gathering plates disposed below said gathering conveyer and laterally spaced apart to define a gathering gap therebetween;

a first gathering roller and a second gathering roller disposed below said gathering conveyer and said gathering plates, said first and second gathering rollers being disposed side by side and mutually spaced apart to define a passage gap therebetween, said first and second gathering rollers being rotatably drivable in opposite directions about respective first and second axes of rotation which are arranged codirectional with a direction of travel of said harvesting device, said first and second gathering rollers including first and second basic bodies, respectively, said first and second basic bodies being formed with respective first and second conical surfaces which taper as a forward end of each of said first and second gathering rollers is approached, each of said first and second gathering rollers including longitudinally extending projections which form working edges protruding beyond each of said first and second basic bodies and which are distributed over a perimeter of said first basic body and second basic body of each of said first and second gathering rollers, such that when rotated in the opposite directions during use, said first and second gathering rollers operate to draw the vegetative material downwardly through said passage gap and said gathering gap, said usable crop being separated from said vegetative material as said vegetative material is drawn though said gathering gap, said usable crop thereby being deposited on said gathering plates and conveyed for collection by said conveyer, said first and second axes of rotation being convergent towards the forward end of said first and second gathering rollers facing said direction of travel whereby the crop entering the passage gap is exposed to a circumferential speed of each of said first and second gathering rollers which is relatively low at the forward ends of said first and second gathering rollers as compared to a relatively large circumferential speed at a discharging end of each of said first and second gathering rollers thereby reducing wear at the front ends of the first and second gathering rollers.

18. A gathering unit according to claim 12, wherein the gathering conveyer includes at least one endless chain having crop-engaging parts which extend laterally from said endless chain.

19. A gathering unit according to claim 12, wherein the gathering conveyer includes a pair of endless chains having crop-engaging parts which extend laterally from said endless chain, said endless chains being driven in opposite directions.

20. A gathering unit according to claim 12 wherein each of said first and second basic bodies have front and rear ends and the respective conical surfaces have front and rear ends, a conicity of said first and second conical surfaces and an angle of convergence of the rotational axes of said first and second gathering rollers being selected such that the circumferential speed of the rear ends of said first and second conical surfaces is about 25% to about 50% greater than the circumferential speed of the front ends of said first and second conical surfaces.

* * * * *